United States Patent [19]
Hanley et al.

[11] Patent Number: 5,460,202
[45] Date of Patent: Oct. 24, 1995

[54] THREE-WAY PIEZOELECTRIC VALVE

[75] Inventors: Mark G. Hanley, Gurnee; Guy P. Caliendo, Algonquin, both of Ill.

[73] Assignee: Landis & Gyr Powers, Inc., Buffalo Grove, Ill.

[21] Appl. No.: 156,278

[22] Filed: Nov. 22, 1993

[51] Int. Cl.$^6$ ................................................ F15B 13/044
[52] U.S. Cl. .................... 137/627.5; 137/596.17; 137/863; 137/870; 251/129.06
[58] Field of Search ............................ 137/596.17, 627.5, 137/863, 870; 251/129.06

[56] References Cited

U.S. PATENT DOCUMENTS

| | | |
|---|---|---|
| 4,481,967 | 11/1984 | Frick . |
| 4,492,246 | 1/1985 | Prescott et al. . |
| 4,492,360 | 1/1985 | Lee, II et al. . |
| 4,527,583 | 7/1985 | Simpson . |
| 4,529,164 | 7/1985 | Igashira . |
| 4,545,561 | 10/1985 | Brown . |
| 4,617,952 | 10/1986 | Fujiwara . |
| 4,695,034 | 9/1987 | Shimizu . |
| 4,705,067 | 11/1987 | Coffee . |
| 4,722,360 | 2/1988 | Odajima et al. . |
| 4,777,383 | 10/1988 | Waller . |
| 4,855,659 | 8/1989 | Riensche . |
| 4,898,200 | 2/1990 | Odajima et al. . |
| 4,901,758 | 2/1990 | Cook et al. . |
| 4,903,732 | 2/1990 | Allen . |
| 5,029,610 | 7/1991 | Hiratsuka . |
| 5,033,496 | 7/1991 | Reid . |
| 5,076,314 | 12/1991 | Ikehata . |
| 5,094,430 | 3/1992 | Shirai et al. . |
| 5,163,463 | 11/1992 | Gassman et al. . |
| 5,207,737 | 5/1993 | Hanley . |

FOREIGN PATENT DOCUMENTS

| | | | |
|---|---|---|---|
| 1121417 | 1/1962 | Germany | 137/627.5 |
| 844742 | 8/1960 | United Kingdom | 137/627.5 |

*Primary Examiner*—Gerald A. Michalsky
*Attorney, Agent, or Firm*—Greer, Burns & Crain, Ltd.

[57] ABSTRACT

A three-way valve having a valve body with an internal output chamber. A supply means is in fluid communication with the output chamber for providing a source of fluid to pressurize the output chamber and thereby obtain a desired device output signal. An exhaust means in fluid communication with the output chamber provides a passage for the fluid to vent from the output chamber out to atmosphere. An output means, also in fluid communication with the output chamber, is included for directing the device output signal from the output chamber to a pneumatic device. A single bending element selectively actuates the supply means or the exhaust means to obtain a predetermined pressure value to be maintained by the valve. The bending element is positioned adjacent and between the supply and exhaust means.

30 Claims, 3 Drawing Sheets

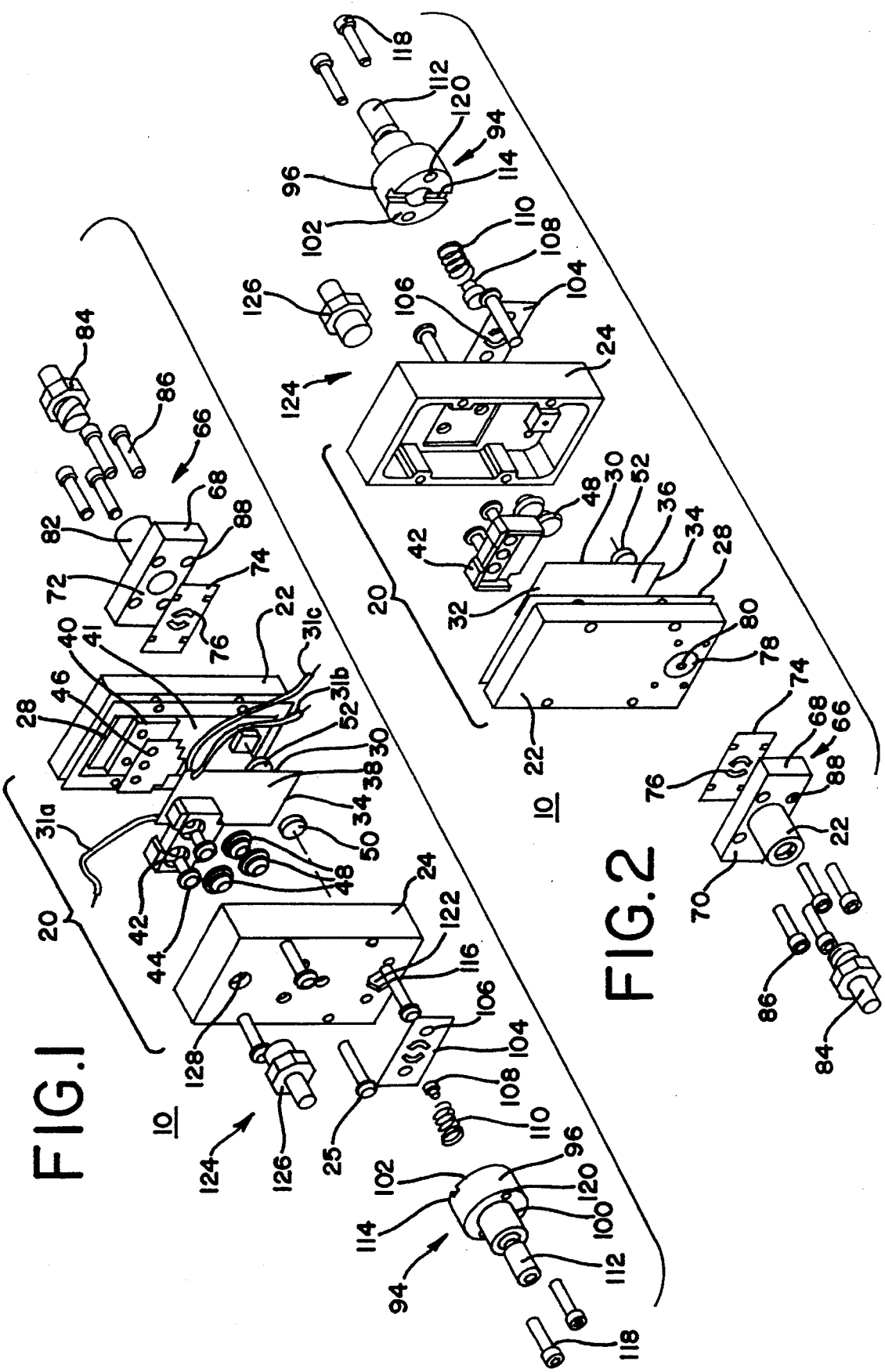

THREE-WAY PIEZOELECTRIC VALVE

The present invention relates generally to an electro-pneumatic pressure converter used to control the pressure, flow and mixing ratio of fluids, and more specifically to a piezoelectric three-way valve having three distinct states of operation with respect to a common output port.

BACKGROUND OF THE INVENTION

Electro-pneumatic systems allow the implementation of electrical control systems by converting electrical signals to a pressure value at the location of the pneumatic mechanism being operated. In conventional electro-pneumatic pressure converters, electrical input signals are used to regulate valves to attain and maintain a desired pressure value for the pneumatic actuator or device connected to the valve.

Electro-pneumatic transducers are typically utilized with devices such as damper actuators, control valves, positioners, step controllers and switching devices. Typically, the electro-pneumatic pressure converter can be used as an interface device to provide a means to control activation of simple pneumatically actuated machinery or for implementing complex HVAC control strategies, directing fluid control systems, and controlling robotic systems and the like with pneumatic devices. Generally, these pneumatic devices require the use of costly transducers which consume large amounts of energy and require significant maintenance.

Electro-pneumatic transducers have been based on two conventional configurations. One configuration utilizes a modulating two-way valve with its input connected to a pressure source through a fixed small opening or restriction and an exhaust output connected to the atmosphere surrounding the device. Varying the effective restriction through the valve results in a variation of the pressure drop across the valve, which typically serves as a device output signal. The disadvantages of such a configuration include an inherent trade-off between output capacity and air consumption, a significant increase in device air consumption as output approaches atmospheric pressure and the inability to effectively control devices having output near to and including atmospheric pressure due to the finite restriction through a full open valve system. A pneumatic relay or amplifier stage is often included in these configurations in order to minimize the effect of these and other difficulties. However, the additional features do not sufficiently diminish the problem, and often actually substantially increases the complexity, size and overall cost of the device.

Yet another known configuration replaces the fixed restriction with an additional modulating two-way valve. These two-way valves are generally referred to as the supply and exhaust valves. In these configurations, changes in output pressure are achieved by simultaneously varying the effective restriction through both valves. Thus, increases in output pressure are generated by simultaneously decreasing the effective restriction through the supply valve on the input pressure source while increasing the restriction through the exhaust valve to atmosphere. Conversely, decreases in output pressure are achieved by increasing the effective restriction through the supply valve simultaneously while decreasing the effective restriction through the exhaust valve.

Conventional miniature valves have utilized direct solenoid actuation. Typically, a three-way solenoid valve provides two distinct states of operation with respect to a common port where either of two input ports may be fluidly connected to the common port. One state of operation requires that the solenoid be de-energized in order to provide a fluid path between the normally open input port and the common port. The second state of operation requires that the solenoid be energized to provide a fluid path between the normally closed input port and the common port and also to eliminate the fluid path between the normally open input port and the common ports. The recognized disadvantages of direct solenoid actuation include high power consumption, high costs, low switching speed, limited ambient temperature range for continuous operation (heat buildup), vibration sensitivity, and limited cycle rating. Another less commonly cited disadvantage of direct solenoid actuation is that the high power levels present in these valves tends to heat the controlled media being directed through the valve, which can be highly undesirable for applications such as in the biomedical field where the fluids being metered may be highly temperature sensitive.

Piezoelectrically actuated valves are generally recognized as offering a lower cost solution to the disadvantages of electro-magnetic devices that have been outlined above. For instance, in U.S. Pat. No. 4,617,952 to Fujiwara, which issued Oct. 21, 1986, a typical piezo element mounting configuration that provides a three-way valve action is illustrated. In Fujiwara a three-way valve utilizing two piezo elements or a single piezo element is described. The dual element approach offers the advantage of a quiescent control state where both piezo elements are sealed against the respective valve nozzles, which effectively disconnects the output chamber from both the supply and exhaust passages and thereby minimizes air consumption.

The presently available single piezo element configurations, such as that disclosed in Fujiwara, have at least one serious drawback in that they do not allow a quiescent condition in which the supply and exhaust passages are sealed with respect to the output chamber. This drawback also results in the further disadvantage of significant air consumption or in restricted output capacity, especially when such valves are used in control schemes requiring continuous modulation of the pneumatic output signal.

Thus, there is a need for a three-way piezoelectric valve which is simple in construction and reasonably affordable to manufacture and which reduces costs by limiting air consumption. Additionally, there is a need for a three-way piezoelectric valve which uses a single piezo element and which allows for a quiescent condition in which the supply and exhaust passages are sealed with respect to the output chamber once a desired output pressure has been attained.

Accordingly, it is an object of the present invention to provide a single element, three-way piezoelectric valve having three distinct states of operation: increase pressure state, decrease pressure state and a quiescent pressure state.

It is a further object of the present invention to provide a three-way piezoelectric valve which utilizes a single piezo element which actuates two normally closed valves with respect to an output chamber.

It is yet another object of the present invention to provide a three-way piezoelectric valve which is low cost, small in size and which provides high switching speed with limited self-heating while being energy efficient and vibration insensitive.

Other features and advantages of the present three-way piezoelectric valve will become more apparent to those skilled in the art upon review of the following detailed description, claims and drawings, and which:

FIG. 1 is a perspective front view depicting the three-way valve in accordance with the invention;

FIG. 2 depicts a perspective rear view of the three-way valve in accordance with the invention;

DETAILED DESCRIPTION OF THE INVENTION

In accordance with the present invention, all of the foregoing objects, as well as others that may become apparent are achieved generally by the present three-way piezo-electro valve. Broadly stated, the valve consists of a valve body assembly having a first side and a second side which when coupled form an output chamber which provides a fluid communication to the three fluid communication ports of the valve. The fluid communication ports consist of a supply or fluid input valve assembly which selectively controls the amount of fluid into the output chamber, an exhaust valve assembly which selectively directs fluid out to atmosphere and a controlled air output assembly which receives the pressurized fluid, or pressure signal, for transmission to the output device. The valve body further includes a single bender element which is adjustably, but securely, mounted to the valve body within the output chamber. The single bender element is positioned between the supply and exhaust valve assemblies such that it can be selectively actuated in order to open/close either the exhaust valve or open/close the supply valve to provide a desired pressure signal to the output source. The bender element is configured to remain in a non-actuating position where both the supply and exhaust valve assemblies remain closed when a desired pressure is attained and a quiescent state is achieved.

Figure 3:
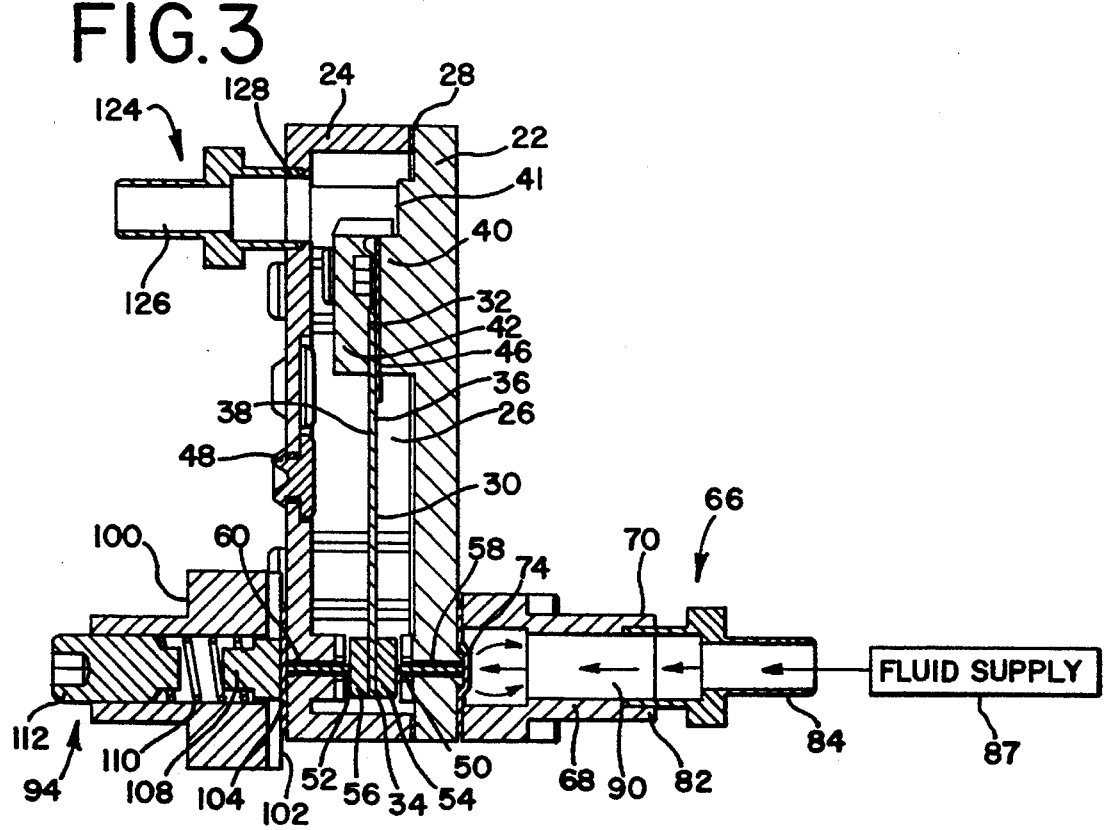
FIG. 3 is a cross-sectional view taken along the vertical plane passing through the center of the present three-way valve which is herein shown in the quiescent state.

More specifically, referring now to the drawings, and particularly to FIGS. 1–3, the current three-way valve is referred to generally as 10. The valve 10 has a main valve body 20 having a first side or mounting plate 22 and a second side or valve cover 24. The mounting plate 22 and the valve cover 24, when fastened together using fasteners 25, form an output chamber 26 within the valve body 20. A sealing gasket 28 can be included between the mounting plate 22 and the valve cover 24 to provide an airtight seal between the parts. It should be understood that the main valve body 20 can be constructed or molded from any sufficiently hardened substance such as metal or polymeric materials that are non-porous and able to withstand high pressures or temperatures.

The present three-way valve 10 includes an electrorestrictive bending element 30 mounted within the output chamber 26. The bending element 30 bends in response to voltage which is selectively applied through a set of attached electrical connectors 31a, 31b and 31c. Such electrorestrictive bending devices are commonly known as piezo benders or simply as benders. The bender 30 is manufactured from a PZT electrically responsive ceramic material. The bender 30 has a first or attachment end 32 and a second or bending end 34 opposite the first end 32. It is the bending end 34 which actually moves towards the appropriate valve assembly to regulate the amount of fluid pressure achieved and maintained within the output chamber 26. The bender 30 also has an upper surface 36 and a lower surface 38.

The bender 30 is fastened to a fixed mounting base 40 which is integral with the inside surface 41 of the mounting plate 22. The mounting base 40, although depicted in FIG. 3 as a generally rectangular formation, can be configured in other formations without departing from the present invention. The mounting base 40 provides a structure to which the bender 30 can be adjustably, but securely mounted at its attachment end 32. The preferred mounting device or fastener is an electrically insulating, self-locating retaining clamp 42 having fasteners 44 that sandwich the attachment end 32 between the clamp 42 and the mounting base 40. A sheet 46 of insulating material, such as Mylar®, is placed between the lower surface 38 of the bender 30 and the mounting base 40, to complete the insulation of the bender 30 from the mounting base 40.

The bender 30 is preferably made of a low cost electrostrictive element such as piezoelectric ceramic material, but it should be understood that other materials having electrostrictive properties can effectively function without departing from the principles disclosed herein. Regardless of the material used for bender 30, electrical leads 31a, 31b and 31c are operationally connected, such as by soldering, to the bender 30 along its attachment end 32. The electrical leads 31a, 31b and 31c are operationally connected at their other end to a given control circuit assembly (not shown). In order to provide an airtight seal around the electrical connections through the mounting plate 22 to the bender, three gommets 48 are utilized.

A piezoelectric bending element utilizes the natural occurring mechanical deformation of the piezoelectric element when supplied or subjected to an applied electrical voltage. In other words, the bender 30, being of an electrostrictive substance, such as piezoelectric ceramic, can be directed to bend towards or away from the supply or exhaust valve assemblies 66 or 94 in response to a controlled amount of voltage directed from a given control circuit (not shown) and applied through the electrical leads 31a, 31b and 31c.

Such a piezoelectric bender is available from several manufacturers and can be selected for various sensitivities to electrical excitation to achieve a desired activated bend. The preferred bender is manufactured from a piezoelectric ceramic compound having a rectangularly shaped configuration with approximate dimensions of 1.5" L× 0.75" W×0.020" H. Other configurations and dimensions for bender 30 can be substituted depending on the particular formation of the valve body 20 or to achieve results not herein specified. The preferred bender 30 is commercially available from Morgan Matroc, Inc., Bedford, Ohio. Other types of benders could be substituted for the bender 30 described here without departing from the present invention.

Referring still to FIGS. 1 and 2 and more specifically to FIGS. 3–6, a pair of poppets, a supply poppet 50 and an exhaust poppet 52, are positioned adjacent to the upper and lower surfaces 36 and 38 of the bending end 34 of the bender 30. Each poppet 50 and 52 consists of an electrically insulating disk 54 and 56 having a small diameter shaft protruding perpendicularly from the surface of the disks 54 and 56 opposite the bender 30. Accordingly, a supply side poppet shaft 58 is connected to the disk 54 and an exhaust side poppet shaft 60 is connected to disk 56. The disks 54 and 56 are preferably made of DELRIN®, but can be made of any other comparably hard, temperature resistant material. The shafts 58 and 60 are preferably made of stainless steel and are fixably secured to the respective disk 54 and 56 by actually piercing the shaft into the disk 54 or 56 opposite the side of the disk 54 or 56 adjacent the bender 30. Although difficult and expensive to manufacture, the shafts 58 and 60 could also be molded together with their respective disks 54 and 56 to form a single piece poppet.

Figure 6:
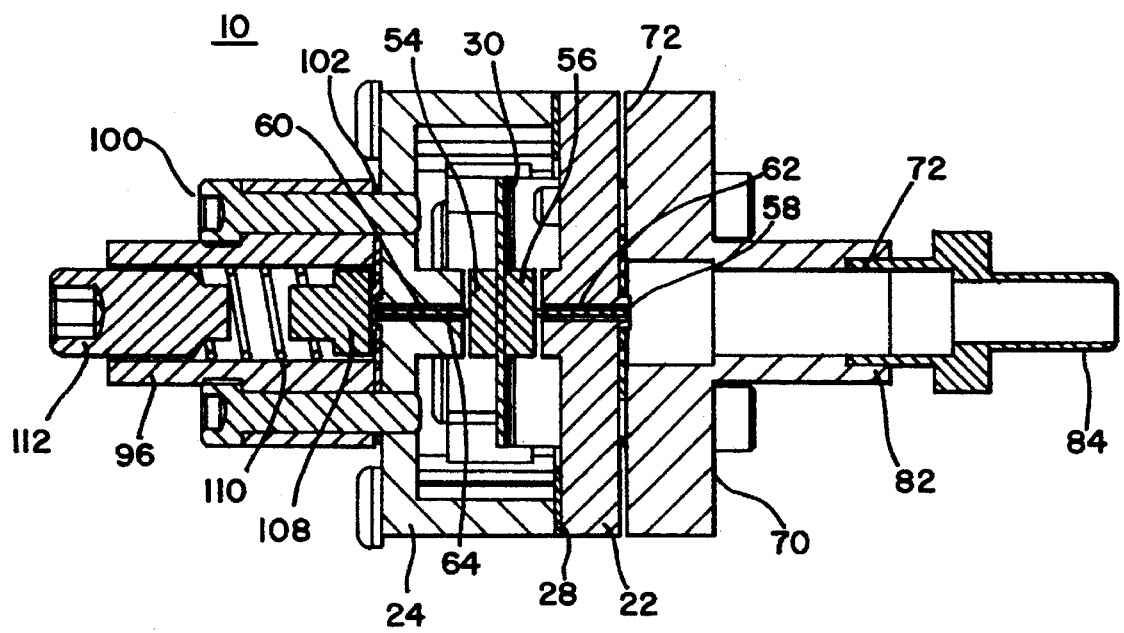
FIG. 6 is a cross-sectional view of the three-way valve taken along the horizontal plane passing through the center of the valve.

The poppet shafts 58 and 60 fit loosely into their respective supply side passage 62 or the exhaust side passage 64 (shown best in FIG. 6). A supply side passage 62 is formed through the mounting plate 22, while an exhaust side passage 64 is formed through the valve cover 24. The shafts 50 and 52 are configured to fit loosely and slide within the supply and exhaust passages 62 and 64 so that the pneumatic fluid can easily enter the output chamber 26 or exhaust to atmosphere from the valve body 20 quickly and easily.

Each of the poppet assemblies 50 and 52 are actually a part of and configured to open or close their respective supply valve assembly 66 or exhaust valve assembly 94. The supply valve assembly 66 includes a supply manifold 68 having a nozzle attachment side 70 and a sealing surface side 72. The supply manifold 68 is configured to capture a supply gasket 74 on its side 72. The supply gasket 74 includes slits or openings 76 which are designed to allow the given pneumatic fluid to flow through the gasket 74, into the supply side nozzle 80 and into the output chamber 26. If the passage openings 76 were not included with the supply gasket 74, pneumatic fluid would be obstructed from freely entering the valve 10 even when the supply poppet 50 is elevated by the bender 30 to actuate the supply valve assembly 66. Also, by using the uniquely configured supply gasket 74, the supply poppet shaft 58 need only be slightly longer than the passage 62 which thereby allows only small bending movements of the bender 30 to actuate the supply valve assembly 66. To concentrate sealing forces on the supply gasket 74 when the supply poppet 50 is not elevated, a sealing bead 78 is included around the supply side passage opening 80.

The supply manifold 68 will typically include, on its nozzle attachment side 70, a fitting feature 82 configured to threadingly or otherwise accept a pneumatic fitting 84. The specific pneumatic fitting 84 chosen will depend on the configuration of the connector or hose from the pneumatic fluid supply apparatus 87. Finally, fasteners 86 are configured to secure the supply valve assembly 66 to the mounting plate 22 through the linearly aligned bores 88 which are formed directly through the supply manifold 68, the supply gasket 74 and which terminate in the mounting plate 22. A supply channel 90 is created through fitting feature 82, fitting 84, manifold 68 that aligns substantially with nozzle 80.

Opposite the supply valve assembly 66 is an exhaust valve assembly 94, which includes an exhaust manifold 96 having a first side 100 and a second side 102. The second side 102 is configured to capture an exhaust gasket 104. As with the supply gasket 74, the exhaust gasket 104 is provided with passage openings 106 to provide a passage for the pneumatic fluid to vent or exhaust to atmosphere when the exhaust valve assembly 94 is actuated by bender 30 elevating on the exhaust poppet 52.

The exhaust valve assembly 94 also includes a plunger 108 and a biasing spring 110 which are located on the first side 100 of the exhaust manifold 96 to provide a biasing force against the exhaust gasket 104 and the exhaust nozzle 122. The biasing force is used to counter the pressure held within the output chamber 26 and thereby guarantee a normally closed condition on the exhaust valve assembly 94 to prevent unwanted escape of fluid from the valve 10. A bias screw 112 allows adjustment of the sealing force applied by the plunger 108 and spring 110. Recesses 114 are formed into the second side 102 of the exhaust manifold 96 to facilitate the venting of the pneumatic fluid out of the exhaust valve assembly 94 and to prevent pressure backup during the opening of the exhaust valve assembly 94. Similar to the supply valve assembly 66, an exhaust side sealing bead 116 is provided to concentrate sealing forces against the exhaust manifold 96 when the bender 30 is not elevating the exhaust poppet 52.

A comparable plunger/spring configuration is not included with the supply valve assembly 66. The pressure created by the supply of pneumatic fluid through the supply valve assembly 66 acts as an air spring which provides a biasing force against the supply gasket 74 and the supply nozzle 80. This biasing force is sufficient to counter (and normally exceed) the pressure held within the output chamber 26 and thereby insure a normally closed condition on the supply valve assembly 66.

Fasteners 118 extend through the linearly aligned bores 120 that are formed through the exhaust manifold 96 and exhaust gasket 104 and which terminate at the valve cover 24 to secure the exhaust valve assembly 94 to the valve cover 24. Once secured to the valve cover 24, the exhaust manifold 96 not only retains the exhaust gasket 104, but also aligns the spring loaded plunger 108 towards a central location over the exhaust side nozzle 122. It is possible that both the supply valve assembly 66 and the exhaust valve assembly 94 can be integrally formed with the mounting plate 22 or valve cover 24 of the valve body 20, but in the preferred embodiment, as described, both assemblies are actually formed of independent components that are securely attached to the valve body 20.

Both the supply poppet 50 and exhaust poppet 52 are dimensioned and configured to provide a mechanical dead band region of approximately 0.004" to insure that unintentional bending of the bender 30 does not result in actuation of either the supply or exhaust valve assemblies 66 or 94. Also the dead band region provides a tolerance for machining and manufacturing deviations in the poppets 50 or 52 or the bender 30. Within the dead band region neither poppet shaft 58 nor 60 is driven against its respective sealing gasket 74 or 104.

Also formed on the valve cover 24 is a controlled air output assembly 124 which directs the pressurized pneumatic fluid (the device output signal) to the actuator or attached pneumatic device (not shown). The output assembly 124 has a pneumatic fitting 126 which is configured to be removably attached to an output port 128. The configuration of the fitting 126 depends on the actuator or device to which it will be attached.

Figure 4:
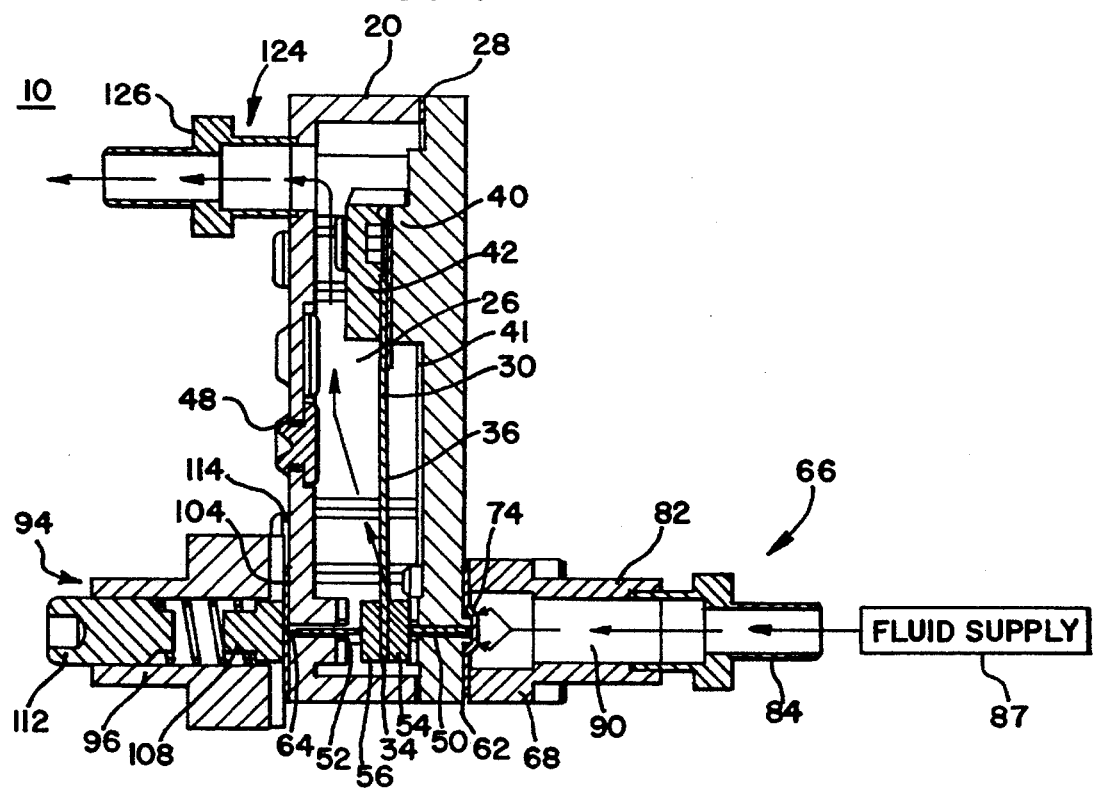
FIG. 4 is the cross-sectional view shown in FIG. 3 depicting the pressure increase state.
Figure 5:
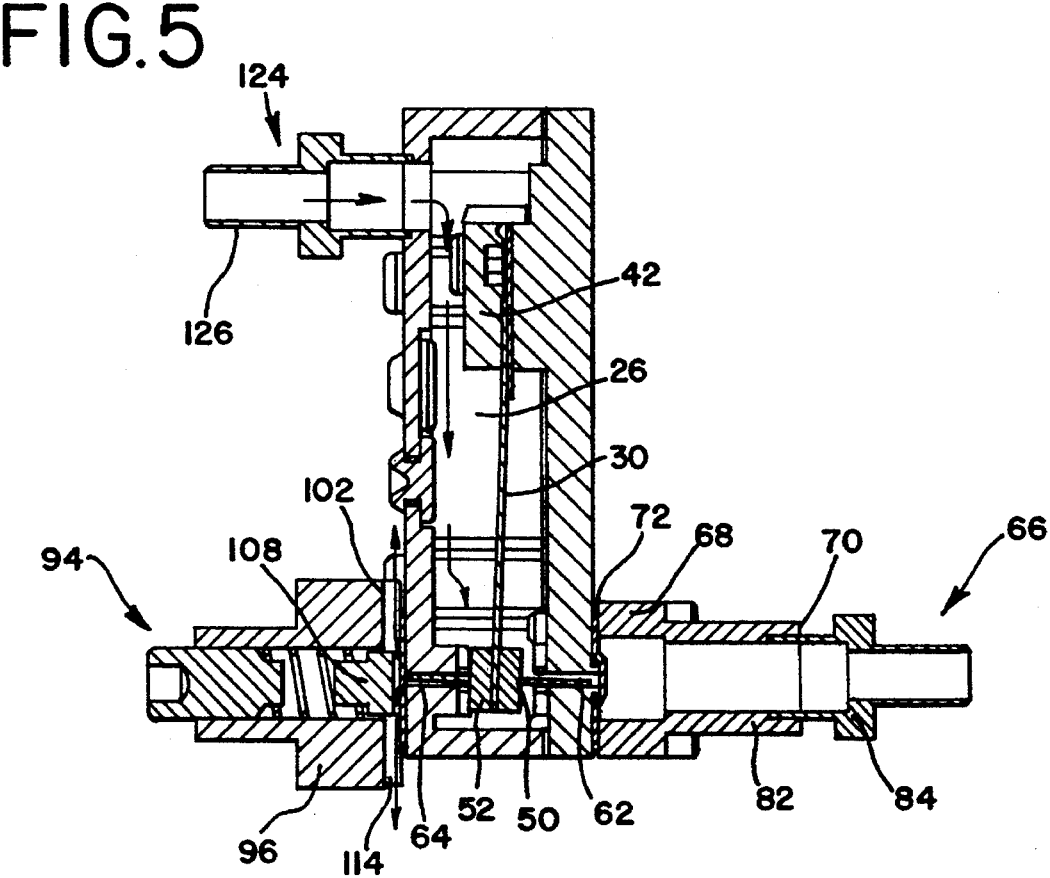
FIG. 5 is the cross-sectional view shown in FIG. 3, depicting the pressure decrease state.

With reference now to FIGS. 3, 4 and 5, the flow of pneumatic fluid is depicted through the use of arrows that demonstrate that the complete valve assembly 10 forms a three-way piezoelectric valve having three distinct operational modes. FIG. 3 depicts the normally desired quiescent state. With the bender 30 positioned parallel to the plane of the mounting plate 22 and valve cover 24, pneumatic fluid will neither be exhausted nor supplied to the output chamber 26. Thus, in the parallel, non-activated state, the bender 30 does not actuate (open) either valve assembly and thereby maintains the previously attained pressure directed to the controlled air output assembly 124. The controlled air output assembly 124 in turn directs the device output signal to the given pneumatic actuator or device.

When the bender 30 does not push against poppet 50, the supply gasket 74 will be driven to a sealed condition, whereby the supply side passage opening 80 remains closed. Once the desired pressure value has been attained within the output chamber 26 and the supply valve assembly 66 is closed, the assembly 66 will remain closed as a result of the input pressure caused by the pneumatic fluid supply held within the supply channel 90. In addition, the spring loaded plunger assembly consisting of plunger 108 and biasing spring 110 will force the exhaust gasket 104 into a sealed condition against the exhaust side nozzle 122 thereby preventing any fluid from unintentionally venting to atmosphere.

Thus, when the bender 30 is in its neutral or parallel position the output chamber 26 is effectively isolated from both the supply valve assembly 66 and the exhaust valve assembly 94. Such an unactuated state of the bender 30 is desirable when a given, predetermined pneumatic fluid pressure is achieved within the output chamber 26, commonly known as the quiescent state. Because the valve 10 is typically in an unactuated or quiescent state, power consumption is low and there is very little if any heat buildup within the valve body 20 or the controlled media being directed through the valve 10.

The quiescent state is not necessarily always the desired state for the present valve 10, since it may be desirable to increase, decrease or re-obtain a desired pressure value within the output chamber 26. It is important to remember that the desired output pressure value within the output chamber 26 translates into the desired device output signal which is directed through the controlled air output assembly 124 to the given pneumatic actuator or device. Accordingly, as shown in FIG. 4, when it is desired that the fluid pressure within the output chamber 26 should be increased, the bender 30 can be electrically driven towards the mounting plate 22 and against the supply poppet 50 (which includes the disk 54 and shaft 58) causing the shaft 58 to push against or lift the supply gasket 74 from the supply side nozzle 80. By lifting the gasket 74 the bender 30 allows the pneumatic fluid to pass from the supply channel 90, beyond the supply gasket 74, into the supply side opening 80 and passage 62, around the supply shaft 58 and into the output chamber 26 where the fluid will pass thru the outlet assembly 124 to a control device until the desired pressure value is achieved.

Similarly, as shown in FIG. 5 it may be desirable to decrease the pneumatic fluid pressure contained within the output chamber 26. Thus, by sending the proper voltage through the electrical leads 31 the bender 30 can be driven away from the mounting plate 22 and towards the valve cover 24 to depress the exhaust poppet 52. By driving the bender 30 towards the exhaust poppet 52, the disk 56 and shaft 60 are driven towards the exhaust valve assembly 94 causing the exhaust gasket 104 to lift away from its exhaust side nozzle 122. Once the exhaust gasket 104 is sufficiently lifted or pushed away from the nozzle 122, the pressurized pneumatic fluid can travel away from the controlled air output assembly 124 and can escape from the output chamber 26, through the exhaust side passage 64, around the exhaust shaft 60 through opening 122 and out to atmosphere.

In summary, by applying an appropriate drive voltage to the bender 30, pneumatic fluid may be admitted into the output chamber 26 from the given pneumatic supply apparatus to attain a desired pressure value or increase the present pressure value; pneumatic fluid may be exhausted from the output chamber 26 to atmosphere to decrease the pressure value; or, the output chamber 26 may be isolated from both the supply and exhaust valve assemblies 66 and 94 to maintain a quiescent state.

In operation, initially the pneumatic fluid, typically air, enters the valve body 20 through the supply valve assembly 66. The cross-sectional views depicted in FIGS. 3, 4, and 5 can again be referred to for a more clear understanding of the fluid flow during operation. Fluid travels through the supply channel 90, it then passes the supply manifold 74 traveling through the passage openings 76 into the supply side passage 62 around the shaft 58 and into the output chamber 26. The output chamber 26 is essentially an open cavity formed within the valve body 20 which not only contains the pressurized pneumatic fluid, but also directs that pressurized pneumatic fluid to the controlled air output assembly 124, or alternatively, when the exhaust valve assembly 94 is actuated, out to atmosphere. The output chamber 26 is configured such that the fluid pressure maintained therein is substantially the same throughout the output chamber 26. The output chamber 26 is also large enough to permit the pressurized fluid or incoming fluid through the supply valve assembly 66 to accumulate or travel around the output chamber 26 without disturbing the bender 30 or causing bender 30 to inadvertently move and depress one of the poppets 50 or 52.

Once the desired pressure value has been attained within the output chamber 26 for direction to the controlled air output assembly 124, the voltage applied to the electrical leads 31*a*, 31*b* and 31*c* is removed allowing the bender 30 to return to its normal, unactuated state. If too much pneumatic fluid has been allowed into the output chamber 26 causing an unwantedly high pressure value, or if it is simply desirable to lower the pressure value within the valve 20, the electrical leads 31*a*, 31*b* and 31*c* can be applied with the proper voltage to cause the bender 30 to bend towards the valve cover and exhaust poppet 52 thereby pushing against the exhaust gasket 104 and allowing the pressurized fluid to escape to atmosphere.

It is contemplated that the present three-way valve 10 can be adapted to include a control circuit (not shown) having a pressure sensor feature which senses the pressure within the output chamber 26 and automatically actuates the bender 30 to bend in the proper direction to either increase pressure (opening the supply valve assembly 66) or decreasing the pressure (opening the exhaust valve assembly 94). The control circuit will thus operate only to increase or decrease the fluid pressure within the output chamber 26 and will not effect the bender 30 when the desired pressure, the quiescent state value, has been attained.

Because of the configuration of the present valve 10, the manufacturing of the component parts and assembly of the valve 10 is cost effective and uncomplicated. Additionally, because the present valve 10 can be configured in a compact, lightweight configuration, it can be adapted for a variety of uses with existing pneumatic actuators or devices or in new control systems. Because of the relative simplicity in the components of the present valve 10, it can easily be configured as a miniature valve for a wide range of industrial, medical or even consumer applications. The present three-way piezoelectric valve 10 also eliminates the disadvantages of the presently available single piezoelement configurations since the bender 30 can open or close the desired valve assembly for increasing or decreasing the pressure value within the valve with extremely fast response times. Therefore, the valve 10 naturally lends itself to use in control schemes requiring continuous modulation of the pneumatic output signal.

Since the valve 10 functions in a substantially airtight environment, fluid and pressure losses are significantly minimized. Because the present valve 10 allows a quiescent condition in which the supply and exhaust passages are sealed with respect to the output chamber pneumatic, fluid consumption is virtually eliminated. Finally, because the present three-way piezoelectric valve 10 utilizes a single bending element 30, which requires only the minimal actuation to open either the supply valve assembly or exhaust valve assembly, high power consumption, low switching speed and heat buildup, problems commonly recognized with solenoid actuated valves, are eliminated.

From a manufacturing standpoint, the present valve 10 is uncomplicated and inexpensive to manufacture and assemble, since the individual components are designed with cost effectiveness in mind. Furthermore, the component parts of the valve 10 are designed to effectively decrease maintenance since valve movements are minimal. The single element configuration eliminates the costs of an additional piezo element and the associated drive circuity while also simplifying the assembly process.

While a preferred embodiment of the present invention has been shown and described, it should be understood that various alternatives, substitutions, and equivalents can be used, and the present invention should only be limited by the claims and equivalents thereof.

Various features of the present invention are set forth in the following claims.

What is claimed is:

1. A three-way valve comprising:

a valve body assembly having a first side and a second side, said first side and said second side forming an internal output chamber within said valve body, said valve body further including a supply opening, an exhaust opening and an output opening which are in fluid communication with said output chamber;

supply valve means for selectively controlling the flow of fluid from a fluid supply source to pressurize said output chamber to a given value, said supply valve means including a shaft being slidably movable through said supply opening, said shaft having a first end and an opposing second end, said first end being adjacent to an actuation means, said shaft being of a length sufficient to extend out of said valve body to push against a supply sealing gasket covering said supply opening and having passage slits, thereby permitting said fluid to flow from said fluid supply source through said supply sealing gasket and supply valve means into said output chamber when said shaft is caused to push against said supply sealing gasket by said actuation means;

exhaust valve means for selectively controlling the flow of fluid from said output chamber out to atmosphere;

said actuation means utilized for selectively actuating said supply valve means and said exhaust valve means to obtain a predetermined pressure value to be maintained within said output chamber for creating a device output signal, said actuation means having at least a quiescent state wherein neither said supply valve means nor said exhaust valve means are actuated and said output chamber is isolated from said supply valve means and said exhaust valve means; and output means in fluid communication with said output opening and said output chamber for directing said device output signal from said output chamber to a pneumatic device.

2. The valve as defined in claim 1 wherein said actuation means is fixedly mounted within said output chamber to one of said first or said second sides of said valve body assembly such that said actuation means is positioned between and substantially adjacent to said supply valve means and said exhaust valve means.

3. The valve as defined in claim 1 wherein said actuation means also provides a pressure increase state and a pressure decrease state wherein said actuation means selectively actuates either said supply valve means or said exhaust valve means.

4. The valve as defined in claim 1 wherein said actuation means is positioned with respect to said supply valve means and said exhaust valve means such that when said actuation means actuates one of either said supply valve means or said exhaust valve means the other of said supply valve means or said exhaust valve means remains unactuated.

5. The valve as defined in claim 1 wherein said actuation means comprises a single two-way bending element.

6. The valve as defined in claim 5 wherein said bending element is made of an electrically sensitive piezoelectric material.

7. The valve as defined in claim 6 wherein said bending element has an attachment end and an opposing bending end and a first side and a second side; and said attachment end being mounted to said valve body within said output chamber, said bending end being positioned substantially between and adjacent to said supply valve means and said exhaust valve means such that when said bender is selectively, electrically stimulated said bender end will respond in a predetermined manner by bending towards and actuating only one of said supply valve means or said exhaust valve means.

8. The valve as defined in claim 1 wherein said exhaust valve means includes an adjustable biasing means which counters the pressure caused by said fluid within said output chamber, thereby forcing said exhaust valve means to remain in a normally unactuated state to prevent said fluid from inadvertently venting from the valve.

9. The valve as defined in claim 1 wherein said supply valve means and said exhaust valve means are located substantially directly across from each other.

10. The valve as defined in claim 1 wherein said shaft has a hard, heat resistant actuator disk attached to said first end of said shaft.

11. The valve as defined in claim 1 wherein said exhaust valve means includes a shaft being slidably movable through said exhaust opening, said shaft having a first end and an opposing second end, said first end being adjacent to said actuation means, said shaft being of a length sufficient to extend out of said valve body to push against an exhaust sealing gasket covering said exhaust opening and thereby permitting said fluid to flow through said exhaust valve means and vent from said output chamber.

12. The valve as defined in claim 11 wherein said exhaust valve means includes an adjustable biasing means which counters the pressure caused by said fluid within said output chamber thereby forcing said exhaust valve means into a normally unactuated state preventing said fluid from venting to atmosphere.

13. The valve as defined in claim 1 wherein said supply valve means is configured so that pressure created by the supply of fluid into said supply valve means provides a biasing force against said supply gasket sufficient to counter the pressure held within said output chamber and thereby insure said supply gasket is held in a normally closed condition.

14. The valve as defined in claim 1 further comprising a sealing bead placed around said supply opening and configured to concentrate sealing forces on said supply gasket.

15. A three-way valve comprising:

a valve body assembly having a first side and a second side, said first side and said second side forming an internal output chamber within said valve body, said valve body further including a supply opening, an exhaust opening and an output opening which are in fluid communication with said output chamber;

supply valve means for selectively controlling the flow of fluid from a fluid supply source to pressurize said output chamber to a given value, said supply valve means including a shaft being slidably movable through said supply opening, said shaft having a first end and an opposing second end, said first end being adjacent to an actuation means, said shaft being of a length sufficient to extend out of said valve body to push against a supply sealing gasket covering said supply opening and having passage slits, thereby permitting said fluid to flow from said fluid supply source through said supply sealing gasket and supply valve means into said output chamber when said shaft is caused to push against said supply sealing gasket by said actuation means;

exhaust valve means for providing a controlled passage for said fluid to vent from said output chamber out to atmosphere, said exhaust valve means includes an adjustable biasing means which counters the pressure caused by said fluid within said output chamber thereby preventing said fluid from inadvertently venting to atmosphere;

said actuation means utilized for selectively actuating said supply valve means and said exhaust valve means to obtain a predetermined pressure value to be maintained within said output chamber for providing a device output signal, said actuation means being positioned with respect to said supply valve means and said exhaust valve means such that when said actuation means actuates one of either said supply valve means or said exhaust valve means the other of said supply valve means or said exhaust valve means remains unactuated; and output means in fluid communication with said output opening and said output chamber for directing said device output signal from said output chamber to a pneumatic device.

16. The valve as defined in claim 15 wherein said actuation means comprises a single two-way bending element.

17. The valve as defined in claim 16 wherein said bending element is made of an electrically sensitive piezoelectric material.

18. The valve as defined in claim 17 wherein said bending element has an attachment end and an opposing bending end and a first side and a second side; and said attachment end being mounted to said valve body within said output chamber, said bending end being positioned substantially between and adjacent to said supply have means and said exhaust valve means such that when said bender is selectively, electrically stimulated said bender end will respond in a predetermined manner by bending towards and actuating only one of said supply valve means or said exhaust valve means.

19. The valve as defined in claim 15 wherein said supply valve means and said exhaust valve means are located substantially directly across from each other.

20. The valve as defined in claim 15 wherein said exhaust valve means includes a shaft being slidably movable through said exhaust opening, said shaft having a first end and an opposing second end, said first end being adjacent to said actuation means, said shaft being of a length sufficient to extend out of said valve body to push against an exhaust sealing gasket covering said exhaust opening and thereby permitting said fluid to flow through said exhaust valve means and vent from said output chamber.

21. The valve as defined in claim 20 wherein said exhaust sealing gasket has passage slits which permit said fluid to pass directly through said exhaust sealing gasket when said shaft is caused to push against said exhaust sealing gasket by said actuation means.

22. The valve as defined in claim 15 wherein said supply valve means is configured so that pressure created by the supply of fluid into said supply valve means provides a biasing force against said supply gasket sufficient to counter the-pressure held within said output chamber and thereby insure said supply gasket is held in a normally closed condition.

23. The valve as defined in claim 15 further comprising a sealing bead placed around said supply opening and configured to concentrate sealing forces on said supply gasket.

24. A three-way valve comprising:

a valve body assembly having a first side and a second side, said first side and said second side forming an internal output chamber within said valve body, said valve body further including a supply opening, an exhaust opening and an output opening which are in fluid communication with said output chamber;

supply means in fluid communication with said supply opening and said output chamber for selectively controlling the flow of fluid from a fluid supply source to pressurize said output chamber, said supply means including a shaft being slidably movable through said supply opening, said shaft having a first end and an opposing second end, said first end being adjacent to a single two-way bending element, said shaft being of a length sufficient to extend out of said valve body to push against a supply sealing gasket covering said supply opening and having passage slits, thereby permitting said fluid to flow from said fluid supply source through said supply sealing gasket and said supply valve means into said output chamber when said shaft is caused to push against said supply sealing gasket by said single two-way bending element;

exhaust valve means in fluid communication with exhaust opening and said output chamber for selectively controlling the flow of said fluid from said output chamber out to atmosphere;

said single two-way bending element having an attachment end and an opposing bending end and a first side and a second side;

said attachment end being mounted to said valve body within said output chamber, said bending end being positioned substantially between and adjacent to said supply valve means and said exhaust valve means such that when said bender is selectively, electrically stimulated said bender end will respond in a predetermined manner by bending towards and actuating only one of said supply valve means or said exhaust valve means to obtain and maintain a given pressure valve within said output chamber; and output means in fluid communication with said output opening and said output chamber for directing said pressure value from said output chamber to a pneumatic device.

25. The valve as defined in claim 24 wherein said exhaust valve means includes and adjustable biasing means which counters said pressure value caused by said fluid within said output chamber, thereby forcing said exhaust valve means into a normally unactuated state to prevent said fluid from inadvertently venting from the valve.

26. The valve as defined in claim 24 wherein said supply valve means and said exhaust valve means are located substantially directly across from each other.

27. The valve as defined in claim 24 wherein said exhaust valve means includes a shaft being slidably movable through said exhaust opening, said shaft having a first end and an opposing second end, said first end being adjacent to said bending element, said shaft being of a length sufficient to extend out of said valve body to push against an exhaust sealing gasket covering said exhaust opening and thereby permitting said fluid to flow through said exhaust valve means and vent from said output chamber.

28. The valve as defined in claim 27 wherein said exhaust valve means includes an adjustable biasing means which counters the pressure caused by said fluid within said output chamber thereby forcing said exhaust valve means into a normally unactuated state preventing said fluid from venting to atmosphere.

29. The valve as defined in claim 24 wherein said supply valve means is configured so that pressure created by the supply of fluid into said supply valve means provides a biasing force against said supply gasket sufficient to counter the pressure held within said output chamber and thereby insure said supply gasket is held in a normally closed condition.

30. The valve as defined in claim 24 further comprising a sealing bead placed around said supply opening and configured to concentrate sealing forces on said supply gasket.

\* \* \* \* \*